(12) United States Patent
Klocke et al.

(10) Patent No.: US 10,532,836 B2
(45) Date of Patent: Jan. 14, 2020

(54) METHOD FOR THE PRODUCTIONS AND FILLING OF AN APPLICATION PACKAGE FOR A LIQUID PHARMACEUTICAL PRODUCT

(71) Applicant: Klocke Verpackungs-Service GmbH, Weingarten (DE)

(72) Inventors: Hartmut Klocke, Karlsruhe (DE); Klaus Renner, Ettlingen (DE)

(73) Assignee: KLOCKE Verpackungs-Service GmbH, Weingarten (DE)

( * ) Notice: Subject to any disclaimer, the term of this patent is extended or adjusted under 35 U.S.C. 154(b) by 584 days.

(21) Appl. No.: 15/055,730

(22) Filed: Feb. 29, 2016

(65) Prior Publication Data

US 2017/0247128 A1    Aug. 31, 2017

(51) Int. Cl.
*B65B 3/02* (2006.01)
*B65B 7/16* (2006.01)
(Continued)

(52) U.S. Cl.
CPC ............... *B65B 3/003* (2013.01); *A61J 1/067* (2013.01); *B29C 51/10* (2013.01); *B29C 51/266* (2013.01);
(Continued)

(58) Field of Classification Search
CPC ......... B65B 3/006; B65B 3/022; B65B 7/164; B65B 9/023; B65B 9/042; B65B 47/02;
(Continued)

(56) References Cited

U.S. PATENT DOCUMENTS 2,632,724 A * 3/1953 Lumbard .......... B29C 66/81261
                                                          53/453
2,813,799 A * 11/1957 Bender et al. .......... B65B 9/042
                                                          53/453
(Continued)

FOREIGN PATENT DOCUMENTS

DE           2656421 A1 *  6/1977  ............. B65B 47/04
DE           2707841 A1 *  8/1978  ......... B65D 75/5811
(Continued)

OTHER PUBLICATIONS

JPO machine translation of JP 2002-179140 A, retrieved from https://www4.j-platpat.inpit.go.jp/eng/tokujitsu/tkbs_en/TKBS_EN_GM101_Top.action, Aug. 2, 2018, 9 pages.*
(Continued)

*Primary Examiner* — Stephen F. Gerrity
(74) *Attorney, Agent, or Firm* — Volpe Koenig, P.C.

(57) ABSTRACT

A method for the production and filling of an application package for a liquid pharmaceutical product. A thermoforming film of thermoplastics laminated together is heated in order to plasticize the film at least in partial areas. Plasticized areas are thermoformed in a mold in order to form a chamber for the liquid pharmaceutical product and a tube-shaped application duct opening into this chamber, with the chamber and duct being enclosed by a non-thermoformed, essentially flat bonding area of the film. The liquid pharmaceutical product is filled into the chamber. The chamber and the application duct are sealed by covering the thermoformed and filled thermoforming film with an essentially flat covering film that is bonded to the bonding area of the thermoforming film enclosing the chamber and the application duct. The thermoforming film is pressed by a forming die during thermoforming into the mold in at least a partial area of the application duct.

13 Claims, 5 Drawing Sheets

(51) Int. Cl.
  *B65B 47/06* (2006.01)
  *A61J 1/06* (2006.01)
  *B65B 3/00* (2006.01)
  *B29C 51/10* (2006.01)
  *B29C 51/26* (2006.01)
  *B29C 51/42* (2006.01)
  *B65B 51/10* (2006.01)
  *B29K 23/00* (2006.01)
  *B29K 67/00* (2006.01)
  *B29K 33/18* (2006.01)
  *B29K 33/00* (2006.01)
  *B29K 105/00* (2006.01)
  *B29L 31/00* (2006.01)

(52) U.S. Cl.
  CPC ............ *B29C 51/424* (2013.01); *B65B 3/022* (2013.01); *B65B 7/16* (2013.01); *B65B 47/06* (2013.01); *B65B 51/10* (2013.01); *B29K 2023/12* (2013.01); *B29K 2033/08* (2013.01); *B29K 2033/18* (2013.01); *B29K 2067/003* (2013.01); *B29K 2105/0085* (2013.01); *B29L 2031/712* (2013.01)

(58) Field of Classification Search
  CPC ......... B65B 47/04; B65B 47/06; B65B 47/08; B65B 2220/16; B65B 3/003; B65D 75/5811; B65D 75/5866; A61J 1/067
  USPC .................... 53/453, 559, 561, 246
  See application file for complete search history.

(56) References Cited

U.S. PATENT DOCUMENTS

| | | | | |
|---|---|---|---|---|
| 3,184,895 | A * | 5/1965 | O'Connor | B65B 9/042 53/453 |
| 3,386,837 | A * | 6/1968 | Arnot | A47G 21/004 53/453 |
| 3,396,062 | A | 8/1968 | White | |
| 3,862,684 | A * | 1/1975 | Schmitt | B65B 3/003 206/277 |
| 3,920,371 | A * | 11/1975 | Faller | B65B 47/04 53/559 |
| 4,871,091 | A * | 10/1989 | Preziosi | B65D 75/5811 222/92 |
| 5,215,221 | A * | 6/1993 | Dirksing | A61J 1/067 169/30 |
| 5,582,665 | A * | 12/1996 | Eigen et al. | B29C 65/18 156/292 |
| 5,623,810 | A * | 4/1997 | Dey et al. | B65B 47/08 53/453 |
| 5,996,845 | A * | 12/1999 | Chan | B65D 75/5811 206/469 |
| 8,381,941 | B2 * | 2/2013 | Barton | B65D 75/366 206/484 |
| 8,806,842 | B1 * | 8/2014 | Penn et al. | B65D 75/5811 222/145.1 |
| 2003/0219515 | A1 * | 11/2003 | Foulke, Jr. | B29C 65/18 426/106 |
| 2004/0080082 | A1 * | 4/2004 | Galassi | B65B 9/04 264/345 |
| 2006/0011666 | A1 * | 1/2006 | Wurtz et al. | B65D 1/095 222/541.1 |
| 2012/0118920 | A1 * | 5/2012 | Havrileck et al. | B65D 75/5811 222/541.9 |
| 2013/0192170 | A1 * | 8/2013 | Dellert | B65B 61/22 53/467 |
| 2013/0266622 | A1 * | 10/2013 | McConaughy et al. | A61Q 5/02 424/401 |
| 2013/0308996 | A1 | 11/2013 | Rodi | |
| 2014/0228785 | A1 * | 8/2014 | Soll et al. | A61J 1/067 604/310 |
| 2015/0090740 | A1 * | 4/2015 | Barton | B65D 75/008 222/211 |
| 2017/0247131 | A1 * | 8/2017 | Klocke et al. | B65B 9/042 |

FOREIGN PATENT DOCUMENTS

| | | | | |
|---|---|---|---|---|
| DE | 202004003781 U1 * | 5/2004 | ......... | B65D 75/5827 |
| DE | 10253964 A1 * | 6/2004 | ............ | B65B 47/08 |
| DE | 202006004323 | 5/2006 | | |
| EP | 2664429 | 11/2013 | | |
| FR | 2560521 | 9/1985 | | |
| JP | 2002179140 | 6/2002 | | |
| JP | 2013188762 A * | 9/2013 | ............ | B21D 5/16 |
| WO | 2008148176 | 12/2008 | | |

OTHER PUBLICATIONS

EPO machine translation of DE 202006004323 U1, retrieved from http://worldwide.espacenet.com/singleLineSearch?locale=en_EP, Aug. 2, 2018, 14 pages.*

* cited by examiner

METHOD FOR THE PRODUCTIONS AND FILLING OF AN APPLICATION PACKAGE FOR A LIQUID PHARMACEUTICAL PRODUCT

BACKGROUND

The invention concerns a method for the production and filling of an application package for a liquid pharmaceutical product. It also involves a thermoforming method using a thermoforming film comprised of plastic. This produces an application package that is configured as a blister pack, i.e. with an essentially flat back side covered by a covering film and a usually translucent or transparent front side composed of a thermoforming film molded part.

In a method of the present type, a thermoforming film comprised of thermoplastics laminated together is first heated in order to plasticize the thermoforming film at least in partial areas. After heating, the thermoforming film is positioned over a mold, and the plasticized thermoforming film is formed into thermoforming dies configured as recesses in the mold, i.e. thermoformed into said dies using a vacuum and/or blast air. For this purpose, in a method of the present type, a mold is used that forms a molded part having a chamber for the liquid pharmaceutical product and a tube-shaped application duct that opens into said chamber by thermoforming of the thermoforming film. The chamber and the application duct are enclosed by a non-thermoformed, essentially flat bonding area of the thermoforming film.

The liquid pharmaceutical product is filled into the thermoforming film that has been molded into a plastic molded part in this manner, the chamber and application duct thereof first being open at the top, with said liquid product essentially filling the chamber, and depending on the filling level, the application duct as well.

The thermoformed and filled thermoforming film is then covered with an essentially flat covering film in order to seal the chamber and the application duct, thus forming a pipet-shaped structure in the form of a blister pack. When it is opened, this blister pack becomes a pipet in the area of a tip of the application duct for applying the pharmaceutical product contained therein, giving rise to the double function of the present application package: it functions as a package for the liquid pharmaceutical product on the one hand and a pipet for application thereof on the other.

In order to complete the application package, the covering film is finally bonded to the bonding area of the thermoforming film enclosing the chamber and the application duct. Depending on the pharmaceutical product with which the application package is to be filled, bonding of the covering film to the thermoforming film is definitely a critical process step, as this bonding must be liquid- and vapor-tight, and generally diffusion-tight as well, and the long-term permeation properties of the liquid pharmaceutical product must also be taken into account.

The main field of use of an application package produced by the method according to the invention is the storage and application of pharmaceutical products active against parasites in pets, particularly fleas and ticks in dogs and cats. Such antiparasitics used in veterinary medicine often contain as their active agent fipronil, which is to be applied directly to a pet's skin in liquid form dissolved in ethanol and/or other organic solvents. The application package is therefore configured as a pipet having a particularly long, tube-shaped extraction duct in order to ensure that the active agent can be applied to the skin even through the fur of a long-haired pet.

An active agent solution that cannot penetrate to the skin of the pet because it is absorbed by the pet's fur cannot achieve the desired effect.

However, it is particularly difficult to apply a liquid active pharmaceutical agent to the skin of a dog or cat, as animals generally do not hold still or sometimes move unexpectedly, so that the liquid active agent solution is all too easily spilled or absorbed by the animal's fur and fails to reach the skin. The tube-shaped application duct, i.e. the pipet shaft, must therefore in this application not only be particularly long, but must also have an exceptionally small cross-section so that the solution contained in the chamber of the application package is only discharged from the open-tipped application duct when pressure is applied to the chamber. The active agent solution therefore must not leak from the open application duct unless pressure is applied to the chamber, even when the application duct is held with the opening facing down.

Finally, a further problem is that a liquid preparation containing the active agent fipronil is not compatible with every plastic, but requires special thermoforming films and covering films comprised of plastic films laminated together which must comprise a layer of an acrylonitrile/methyl acrylate (AMA) copolymer available on the market under the registered trademark Barex®. Although such films can be thermoformed and sealed, their thickness sometimes varies, particularly when the film is plasticized for thermoforming and then deformed.

However, the particularly long form of the pipet shaft formed by the application duct of the application package needed for the present application and the small clear cross-section of the application duct required for reliable application, which prevents accidental leakage of the liquid active agent solution from the open pipet shaft, require precise dimensional accuracy, particularly for the thermoforming film in the area of the application duct. This is because variations in thickness or warping in this area impair the clear cross-section of the application duct and thus directly impair the dosing properties of the active agent solution during application: if the clear cross-section is too small at one or more locations, it is difficult to apply the active agent solution from the chamber onto the site on the pet to which the active agent is to be applied. If a slightly larger clear cross-section of the application duct is selected for safety reasons connected with tolerances, there is a risk that the active agent solution may leak from the open application duct even when no pressure is applied to the chamber.

SUMMARY

The object of the present invention is therefore to provide a method for the production and filling of an application package of the aforementioned type in which the dimensional accuracy of the application duct of the application package produced, and particularly the dimensional accuracy of its clear cross-section, can be ensured.

This object is achieved by a method having one or more characteristics of the invention.

According to the present invention the thermoforming film is pressed by a forming die during thermoforming into the mold in at least a partial area of the application duct. Here, "during thermoforming" means that the forming die allows pre-stretching of the material into the mold, with this pre-stretching thus taking place before the actual thermoforming process; additionally or alternatively, the forming die can also be used simultaneously with the actual thermoforming process and support said process. By the use of such preparatory and/or accompanying pressing using a forming die, the thermoforming film is molded with particular precision, and according to the invention, specifically in an area in which dimensional accuracy is of particular significance: the tube-shaped application duct. This can be seen to be particularly advantageous compared to prior art in particular in cases where the thermoforming film comprises an AMA copolymer film.

In pre-stretching and/or thermoforming using the forming die according to the invention, the thermoforming film is preferably in a thermally plasticized state such that the thermoforming film is calibrated when it is pressed in and/or pre-stretched between the forming die and the mold. Any variations present in the thickness of the film material are evened out in this calibration process. In this case, use of the forming die ensures that the tube-shaped application duct not only corresponds exactly in its outer wall to the shape dictated by the mold, but also has an inner surface that shows high dimensional accuracy, which ensures the essential dimensional accuracy of the clear cross-section of the application duct.

In the case of active agent solutions containing fipronil, which often contain further solvents in addition to ethanol, such as butyl hydroxyanisole and butyl hydroxytoluene, and show particularly high penetration capacity, the variations in thickness occurring in particular in AMA copolymer films and laminates containing them cause problems with tight bonding of the covering film to the bonding area of the thermoforming film enclosing the chamber and the application duct. The slightest irregularity in the bond between the covering film and the thermoforming film can cause the active agent solution to leak or diffuse out during longer-term storage of the application package filled with said active agent solutions.

It is therefore particularly preferred within the scope of the present invention to directly bond the covering film to the bonding area of the thermoformed and filled thermoforming film by thermal ring sealing. In a particularly preferred embodiment, this thermal ring sealing is achieved by a sealing tool that is plate-shaped per se, said tool being placed on the covering film in the bonding area, but with only a heated ring projection that projects beyond one supporting surface of the sealing tool coming into direct contact with the covering film. The heated ring projection produces high surface pressure at the site where it presses the covering film and the thermoforming film together between itself and a counterplate. As it is heated, this gives rise to a ring-shaped direct bonding by thermal sealing between the covering film and the thermoforming film. This ring-shaped direct bond encloses the chamber and the application duct of the application package, resulting in a tight seal with long-term stability. This is therefore also particularly advantageous because the application package according to the invention comprises a long tube-shaped application duct with an exceptionally small cross-section, so that the solution contained in the chamber of the application package is only discharged from the open-tipped application duct when pressure is applied to the chamber. The thermal ring sealing preferred according to the invention reliably prevents the active agent from accidentally leaking out between the covering film and the thermoforming film when pressure, which may be strong depending on the application in question, is applied to the chamber.

In order to achieve a high-grade appearance of the application package, however, it is also necessary for the covering film to adhere not only to the ring sealing of the thermoforming film; rather, the covering film should adhere to the entire bonding area of the thermoforming film at least outside the ring sealing. This is preferably achieved within the scope of the present invention in that the heated ring projection projects only slightly beyond the supporting surface of the plate-shaped sealing tool and the latter is also heated next to or outside of the ring projection so that when the ring sealing is sealed, only a slight gap remains between the supporting surface of the sealing tool and the covering film. The radiant heat of the plate-shaped sealing tool causes the covering film and/or the thermoforming film to be exposed to heat radiation next to the ring projection as well, so that the thermoforming film and the covering film adhere to each other essentially in the whole bonding area lying outside the ring sealing. When the application package is punched out of the thermoforming film in its final form, this prevents the covering film from detaching from the thermoforming film along the outer edge of the punched-out application package, which could—although this would not impair the tightness of the ring sealing—leave the package with an inferior appearance.

The sealing process naturally takes place with the chamber of the application package to be produced already filled. It is therefore preferred within the scope of the present invention to use a sealing tool that is not heated inside the heated ring projection or is provided with a thermally insulating material, specifically at least in an area that comes to rest over the chamber and the application duct during thermal ring sealing. This advantageously reduces heat transfer to the covering film above the chamber and the application duct, and thus also heat transfer to the liquid pharmaceutical product contained therein, so that the risk of accidental evaporation or partial evaporation of the liquid pharmaceutical product is eliminated. This is because such gas formation could impair the sealing process on the one hand and again compromise the dimensional accuracy of the internal cross-section of the application duct on the other.

As is known per se, it is preferred in the present invention to carry out the actual thermoforming process using blast air, i.e. to form the plasticized areas of the thermoforming film in the mold by using blast air. With respect to the critical dimensional accuracy of the application duct of an application package of the present type, it has been found to be advantageous if the blast air is heated at least in the area of the application duct. This improves formation of the thermoforming film in this area and thus directly affects the dimensional accuracy of the application duct after forming.

It has also been found to be advantageous within the scope of the present invention if the thermoforming film is heated by a contact heater before thermoforming, with essentially only those areas of the thermoforming film that are provided for forming the chamber and the application duct during thermoforming being heated for plasticization. Therefore, the other areas of the thermoforming film are preferably not plasticized, which in turn has a positive effect on the dimensional accuracy of the application duct in particular. It is particularly preferable to heat the thermoforming film from both sides before thermoforming, which results in particularly efficient plasticization in the thermoforming process.

In the main field of use of the application package to be produced by the present invention, i.e. the use of antiparasitics in pets, particularly dogs and cats, a problem in the case of dogs in particular is that there is no dosing amount that is uniformly suitable for all species of dogs. Rather, application packages must be manufactured in different sizes in order to be able to cover all of the various cases of application.

In order to minimize production costs, it is preferred within the scope of the present invention to work with interchangeable molds. These interchangeable molds are configured as thermoforming plates with recesses into which the thermoforming film is thermoformed. These recesses are configured with different depths in the interchangeable molds so that during thermoforming the thermoforming film forms chambers having different volumes without any other modifications in the form of the application package. Accordingly, all other parts of the production system and its machine parameters can remain unchanged, with it only being necessary to change or modify the mold configured as a thermoforming plate and the dosing volume of the liquid pharmaceutical product to be filled in order to produce application packages having different chamber volumes.

Within the scope of the present invention, it is preferred to use as a thermoforming film a laminated composite film comprising a layer of polypropylene (PP) and a layer of an acrylonitrile/methyl acrylate (AMA) copolymer, preferably a film available under the brand name Barex®. As a covering film, one should preferably use a laminated composite film comprising a layer of polyethylene terephthalate (PET), a layer of aluminum, and a layer of an acrylonitrile/methyl acrylate (AMA) copolymer, again preferably a film available under the brand name Barex®. Using such thermoforming films and covering films, the applicant was able to achieve the most favorable results, particularly when the thermoforming film had a thickness of about 200 μm of PP and about 350 μm of AMA copolymer, and particularly when the covering film had a thickness of approx. 12 μm of PET, approx. 12 μm of aluminum, and approx. 35 μm of AMA copolymer, and these values may vary by approx. ±10%.

The contact heater for heating the thermoforming film in the areas provided for forming the chamber and the application duct during thermoforming is preferably separately adjustable for heating of the thermoforming film from above and heating of the thermoforming film from below. This is advantageous in use of a thermoforming film composed of polypropylene and AMA copolymer for achieving dimensional accuracy—particularly for the application duct, which is critical in this respect—because the temperature range in which the material of the thermoforming film is plasticized is typically about 80° C. for AMA copolymer, while it is typically about 150° C. for polypropylene.

The thermoformed and filled thermoforming film sealed with the covering film is preferably punched out in order to complete the application package. In this case, it is particularly advantageous within the scope of the present invention to cool the filled thermoforming film bonded to the covering film after thermal ring sealing and before punching out. This is especially advantageous because of the particularly long configuration of the tube-shaped application duct of the present application package; specifically, this cooling prevents warping of the application duct during punching out and ensures the required high dimensional accuracy of the application duct.

As is known per se, it is also possible within the scope of the present invention to thermoform a plurality of application packages simultaneously into one and the same thermoforming film and seal them with the covering film in a single working step. Separation is then conducted by punching out the individual application packages.

In order to allow opening of the finished application package for use of the liquid pharmaceutical product contained therein, the application duct is preferably provided, in an end area opposite the point at which it opens into the chamber of the application package, with a predetermined breaking point in order to form a tip that can be broken off or easily and reproducibly cut off. The predetermined breaking point can be a slot or a groove in the thermoforming film, or even a pinched area; what is important is that a weakened area is provided in the material at the predetermined breaking point in order to allow the application duct to be broken off, thus opening the application package.

The production of a predetermined breaking point in the form of a slot is preferably carried out before plasticizing and thermoforming of the thermoforming film. In the case of a composite film, for example, the outer layer is cut through, and optionally, a slot is made in an underlying layer. If the thermoforming film is comprised of a layer of PP and a layer of AMA copolymer, for example, the PP layer can be cut through and a slot made in the AMA copolymer layer.

Particularly when a predetermined breaking point is provided in the end area of the application duct, the dimensional accuracy thereof, with respect both to external diameter and internal diameter, as well as dimensional accuracy in the circumferential thickness of the application duct, is of vital importance, because if the application duct does not have particularly precise dimensional accuracy at this predetermined breaking point, it can leak at this point, or the opening resulting when the tip is broken off can be too large or fail to have the desired shape and dimensions for the desired functionality.

The punched-out application package can be packed within the scope of the present invention in a secondary package configured as a blister pack, with this pack preferably being composed of laminated composite films comprising a layer of polyethylene terephthalate (PET), a layer of polypropylene (PP), and/or a layer of polyethylene (PE). Such a secondary package is advantageous in that the application package is protected against penetration by moisture and in particular in that the dimensional stability of the pipet, and particularly the application duct thereof, is ensured during transportation and storage.

BRIEF DESCRIPTION OF THE DRAWINGS

An exemplary embodiment of implementation of the method according to the invention is described and explained in greater detail with reference to the attached drawings. The figures are as follows.

DETAILED DESCRIPTION OF THE PREFERRED EMBODIMENTS

Figure 1A:
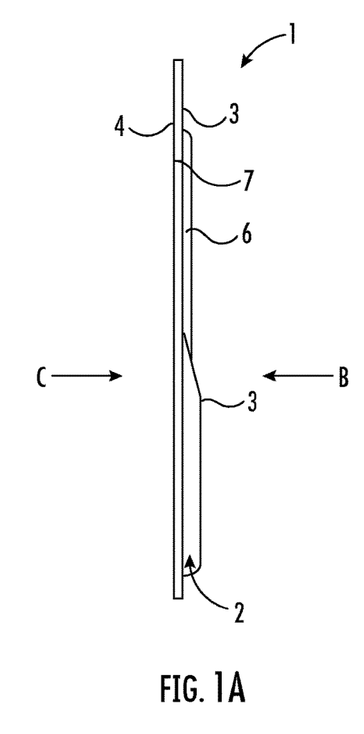
FIGS. 1A-1C show an application package produced by a method according to the invention.
Figure 1B:
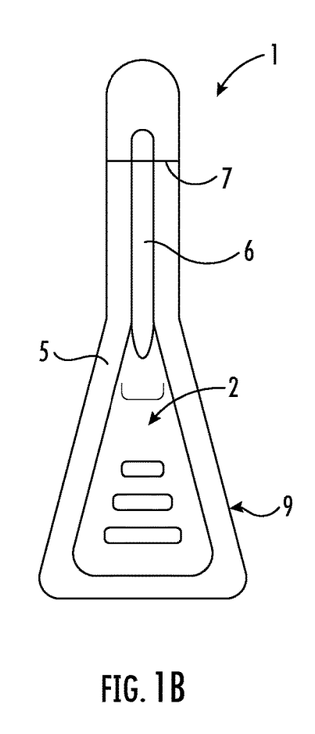
Figure 1C:
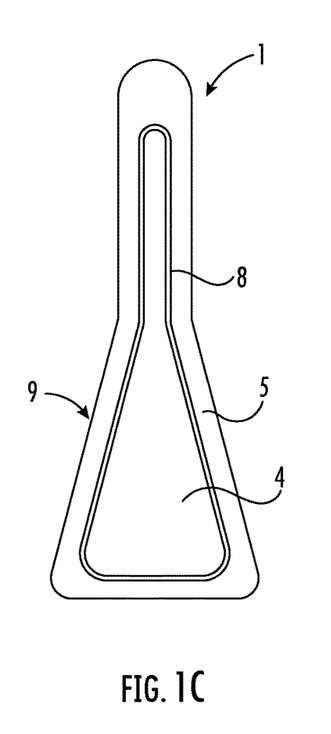

The application package 1 for an antiparasitic in a liquid active agent solution shown in FIG. 1A in a side view, in FIG. 1B in a bottom view, and in FIG. 1C in a top view is composed of a thermoforming film 3 and a covering film 4, with the thermoforming film 3 as a molded part forming a chamber 2 for the liquid pharmaceutical product and a tube-shaped application duct 6 opening into this chamber 2. The chamber 2 and the application duct 6 are enclosed by an essentially flat bonding area 5 of the thermoforming film 3. The covering film 4 covers the chamber 2 and the application duct 6 from the top and is bonded in the bonding area 5 of the thermoforming film 3 to said film. Bonding was carried out by thermal ring sealing, so that a ring sealing 8 surrounding the chamber 2 and the application duct 6 is visible in the top view (FIG. 1C). In sealing the covering film 4 onto the thermoforming film 3, the area 9 outside the ring sealing 8 was exposed to heat radiation in order to cause the covering film 4 to adhere to the thermoforming film 3 in said area as well. Finally, the application duct 6 is provided in an end area with a slot or a groove 7, which forms a predetermined breaking point at which the tip of the application duct 6 can be broken off in order to open the application package 1 for use.

Figure 2:
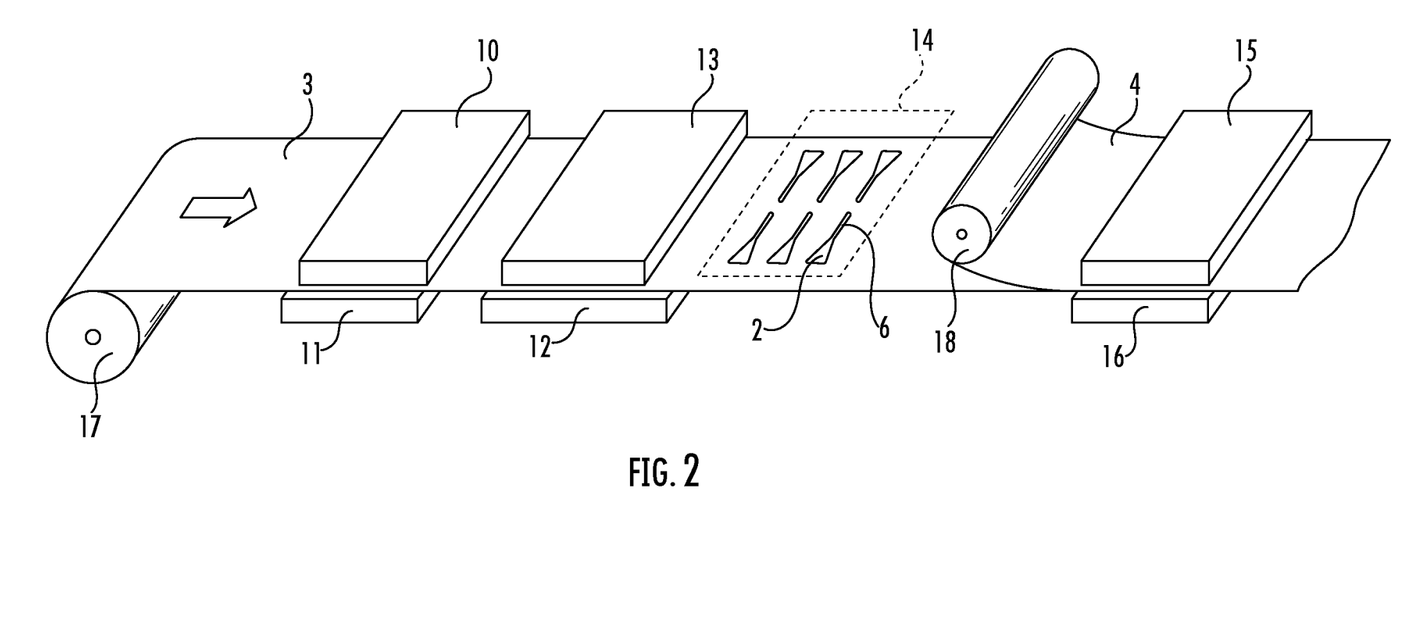
FIG. 2 shows a schematic diagram of the production of the application package of FIG. 1.

FIG. 2 shows a schematic view of the most important stations in production of the application package 1 shown in FIG. 1. First, the thermoforming film 3 is pulled off by a first roller 17 and fed synchronously through a heating station with an upper heating plate 10 and a lower heating plate 11. Here, the thermoforming film 3 is heated until it plasticizes in those areas that are later to be formed. In this case, the upper heating plate 10 and the lower heating plate 11 can be adjusted separately in order to produce different temperatures for the upper side and lower side of the thermoforming film 3. This is because in the present exemplary embodiment, the thermoforming film 3 is a laminated composite film with a layer of polypropylene (PP) having a thickness of approx. 200 μm and a layer of Barex® having a thickness of approx. 350 μm. As the temperature range in which the Barex® layer is plasticized is typically around 80° C., while the temperature range in which the layer of polypropylene is plasticized is typically around 150° C., the upper and lower heating plates 10, 11 are set to these temperature ranges separately from each other.

After passing through the heating station, the thermoforming film 3 is fed to a thermoforming station with a mold 12 and a blowing plate 13. The mold 12 has a plurality of recesses in which the plasticized areas of the thermoforming film 3 are formed or thermoformed in the mold 12 by means of blast air from the blowing plate 13 and suction.

In the next cycle of the production process, the product from the thermoforming station is positioned below a dosing device 14, indicated here only by broken lines, which fills the liquid pharmaceutical product into the chamber 2 and the application duct 6 that were formed in the thermoforming film 3.

After filling of the thermoformed areas of the thermoforming film 3 in the dosing device 14, the covering film 4 is pulled off by a second roller 18 and placed on the thermoforming film 3. In a sealing station composed of a sealing plate 15 and a counterplate 16, the covering film 4 is sealed onto the thermoforming film 3, specifically by means of thermal ring sealing.

After a punching process (not shown here) in which the individual application packages 1 are punched out, the application package is in the form shown in FIGS. 1A-1C.

Also not shown in FIG. 2 is a device for producing the slot or groove 7 as a predetermined breaking point. This device is positioned upstream from the upper heating plate 10 and the lower heating plate 11, as the thermoforming film 3 is provided with corresponding slots prior to heating in the heating station, which later forms the predetermined breaking point in the application duct 6 of the formed application package 1. For this purpose, the PP layer is cut through and the Barex® layer is weakened.

Figure 3:
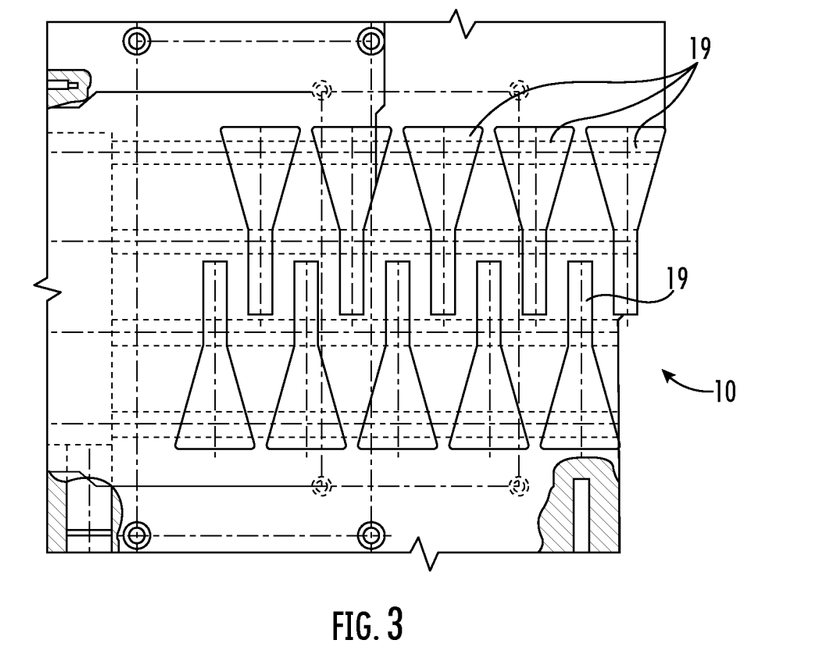
FIG. 3 shows a schematic top view of a heating plate.

FIG. 3 shows a schematic top view of the upper heating plate 10 of the heating station shown in FIG. 2. As shown in FIG. 3, the upper heating plate 10 is equipped with a number of partial areas 19 in which the upper heating plate 10 comes into contact with the thermoforming film 3. After this, the thermoforming film 3 is plasticized by contact heating only in the partial areas 19 that are to be finally molded in the thermoforming station. The areas of the thermoforming film 3 outside of the partial areas 19 are not heated to a sufficient degree to cause plasticization.

The heating station is comprised of the upper heating plate 10 shown here and the lower heating plate 11 shown by way of example in FIG. 2. In designing the heating surface contours, the two plates are configured congruently so that only the areas of the thermoforming film 3 that are to be deformed are plasticized in the heating station.

Figure 4:
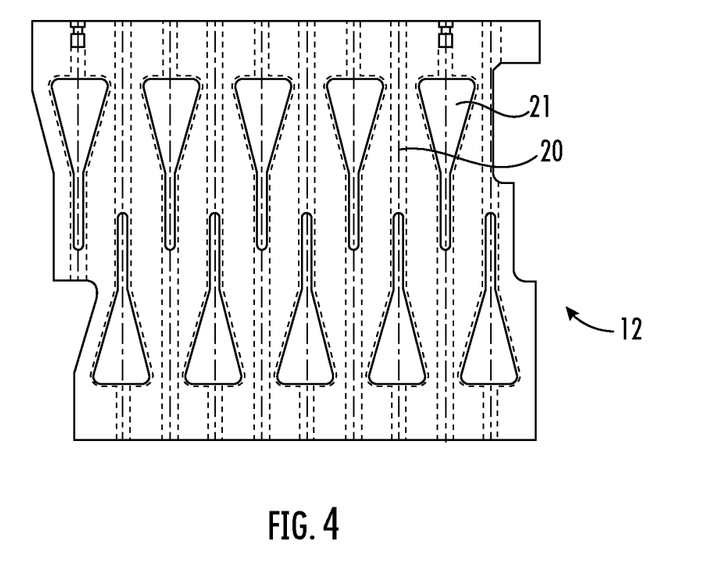
FIG. 4 shows a schematic top view of a mold for thermoforming.

FIG. 4 is a schematic top view of the mold 12 for thermoforming of the chamber 2 and the application duct 6 of the application package 1. The broken lines indicate venting ducts 20 that allow the thermoforming film 3 to be completely molded in recesses 21 for forming the chamber 2 and the application duct 6.

Figure 5:
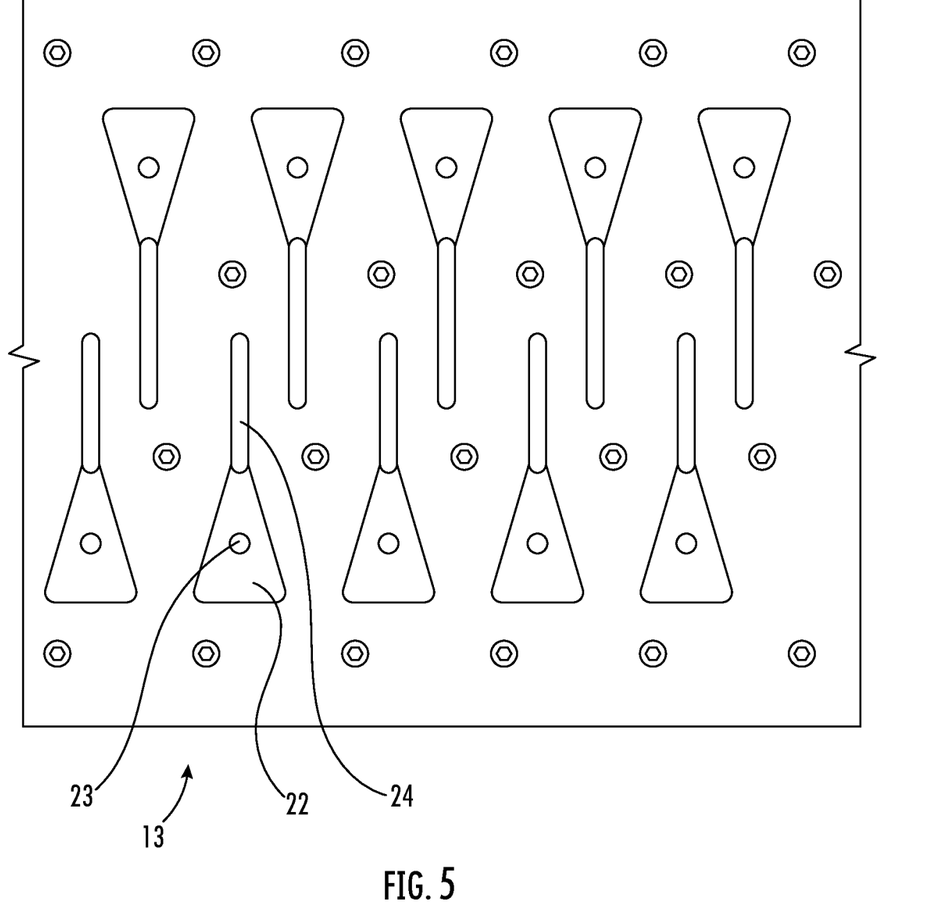
FIG. 5 shows a schematic top view of a blowing plate for thermoforming.

FIG. 5 shows a schematic top view of the counterpart to the mold 12; this is a blowing plate 13. In the areas of the blowing plate 13 that come to rest over the chamber 2 and application duct 6 to be molded in the thermoforming film 3, pressure relief chambers 22 with blow openings 23 can be seen.

According to the present invention, the blowing plate 13 is also equipped with forming dies 24 that are movable with respect to the blowing plate 13 and can be moved out of said plate in order to press the thermoforming film 3 into the mold 12, thus pre-stretching it.

Figure 6A:
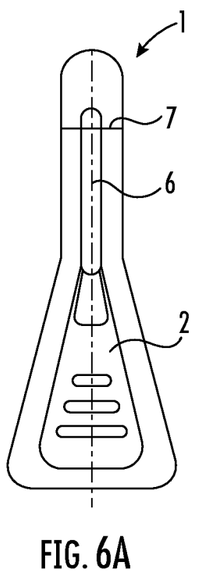
FIGS. 6A-6D show the application package of FIGS. 1A-1C in various sizes.
Figure 6B:
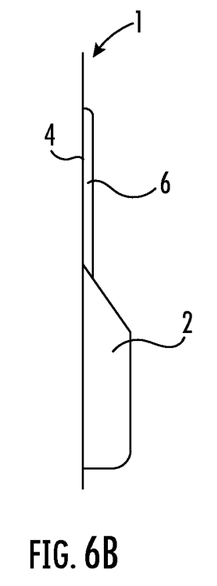
Figure 6C:
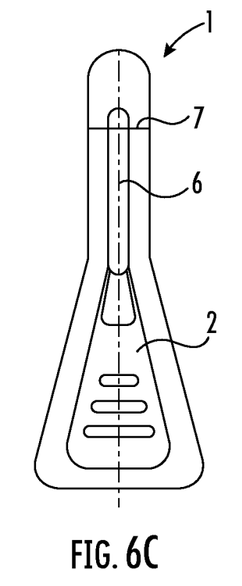
Figure 6D:
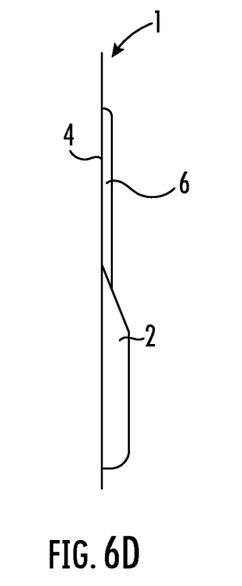

FIGS. 6A through 6D show application packages 1 of different sizes; the application package shown in FIGS. 6A and 6B is filled with a greater amount of pharmaceutical active agent solution than the application package 1 shown in FIGS. 6C and 6D, e.g. for use of an antiparasitic for large and small dogs.

As can be clearly seen, the two application packages 1 cannot be distinguished in the top view in FIGS. 6A and 6C; it only becomes clear from the side views of FIGS. 6B and 6D that the chamber 2 has different volumes. This is achieved according to the present invention by using interchangeable molds 12 that optionally lead to a chamber 2 having a reduced volume shown in FIGS. 6C and 6D or to a chamber 2 having a larger volume shown in FIGS. 6A and 6B. With the exception of the dosing device 14, further modifications need not be carried out in the system in which the method according to the invention is carried out in order to produce the different sizes of the application package 1 shown here.

Figure 7A:
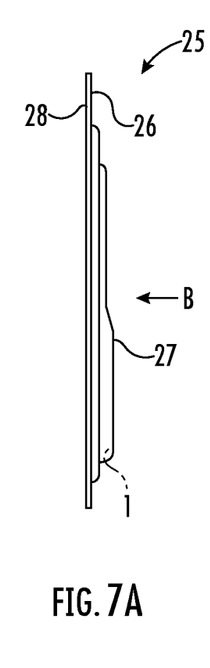
FIGS. 7A and 7B show three application packages of FIGS. 1A-1C that are packaged in a secondary package.
Figure 7B:
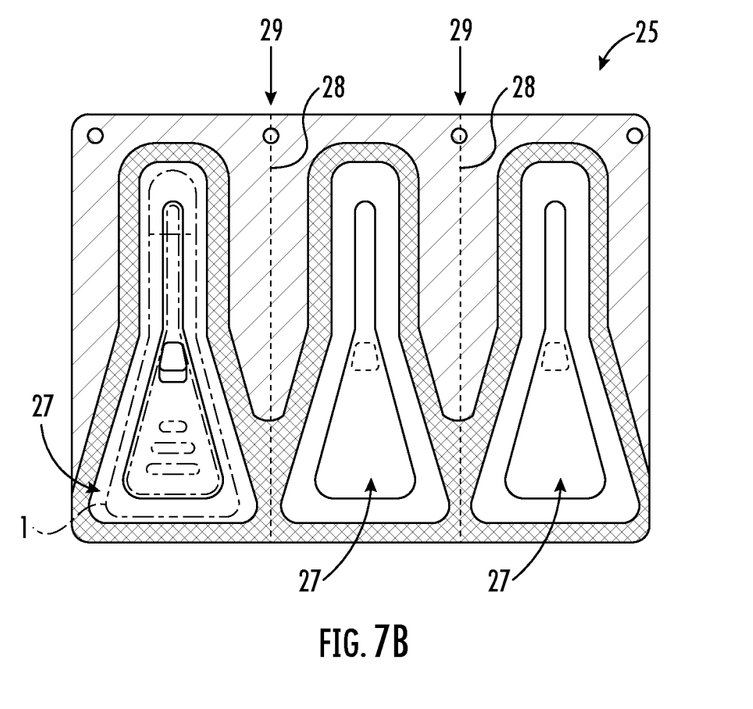

Finally, FIGS. 7A and 7B show a side view and a top view of a sales unit with three application packages 1, which are packed in a secondary package 25 configured as a blister pack. This secondary package is comprised of a thermoformed blister film 26 with three blister-containing areas 27 for the application packages 1. The blister-containing areas 27 are sealed with a peelable blister covering film 28.

The thermoformed blister film 26 is comprised in this case of a PET/PP/PE laminate having a thickness of 350/100/75 μm. The peelable blister covering film 28 is composed of a PET/Al/PE laminate having a thickness of 12/12/50 μm.

The secondary package 25 has perforations 28 between the three blister-containing areas 27 at which the individual blister-containing areas 27 with the application packages 1 contained therein can be separated. In order to allow the individual application packages 1 to be torn off by hand, the secondary package 25 is provided with pre-cut areas 29 that can be torn off. To remove an application package 1, the blister covering film 28 is simply pulled off the thermoformed blister film 26 by hand.

The invention claimed is:

1. A method for the production and filling of an application package (1) for a liquid pharmaceutical product, comprising the following process steps:
   heating a thermoforming film (3) comprised of thermoplastics laminated together in order to plasticize the thermoforming film (3) at least in partial areas (19),
   thermoforming plasticized areas of the thermoforming film (3) in a mold (12) in order to form a chamber (2) for the liquid pharmaceutical product and a tube-shaped application duct (6) having a clear internal cross-section that extends between the chamber (2) and a dispensing end of the application duct (6), with the chamber (2) and the application duct (6) being enclosed by a non-thermoformed, essentially flat bonding area (5) of the thermoforming film (3),
   filling the liquid pharmaceutical product into the chamber (2) of the thermoformed thermoforming film (3),
   covering the thermoformed and filled thermoforming film (3) with an essentially flat covering film (4) in order to seal the chamber (2) and the application duct (6) while maintaining the clear internal cross-section,
   bonding the covering film (4) to the bonding area (5) of the thermoforming film (3) enclosing the chamber (2) and the application duct (6),
   pressing the thermoforming film (3) by a forming die (24) during thermoforming into the mold (12) in at least a partial area of the application duct (6) in a thermally plasticized state of the thermoforming film (3), and
   calibrating the thermoforming film (3) between the forming die (24) and the mold (12) in order to ensure a dimensional accuracy of the application duct (6).

2. The method as claimed in claim 1, further comprising thermoforming the plasticized areas of the thermoforming film (3) into the mold (12) using blast air, and heating the blast air at least in the area of the application duct (6).

3. The method as claimed in claim 1, further comprising heating the thermoforming film (3) using a contact heater (10, 11) before thermoforming, with essentially only those areas (19) of the thermoforming film (3) that are provided for forming the chamber (2) and the application duct (6) during thermoforming being heated for plasticization.

4. The method as claimed in claim 3, further comprising heating the thermoforming film (3) from both sides before thermoforming.

5. The method as claimed in claim 1, further comprising using exchangeable molds (12) in order to modify as needed a volume of the chamber (2) produced during thermoforming of the thermoforming film (3).

6. The method as claimed in claim 1,
wherein
a laminated composite film comprising a layer of polypropylene (PP) and a layer of an acrylonitrile/methyl acrylate (AMA) copolymer is used as the thermoforming film (3), and the laminated composite film is heated for plasticization in an area of the application duct before thermoforming the duct to improve the dimensional accuracy of the clear internal cross-section of the application duct.

7. The method as claimed in claim 6,
wherein
the AMA copolymer layer has a thickness of 350 μm±10%.

8. The method as claimed in claim 1,
wherein
a laminated composite film comprising a layer of polyethylene terephthalate (PET), a layer of aluminum, and a layer of an acrylonitrile/methyl acrylate (AMA) copolymer is used as a covering film (4).

9. The method as claimed in claim 1, further comprising simultaneously thermoforming a plurality of the application packages (1) into one and the same thermoforming film (3) and sealing the plurality of the application packages with the covering film (4) in a single working step, and punching out the thermoformed and filled areas of the thermoforming film (3) sealed with the covering film (4) in order to complete the application packages (1).

10. The method as claimed in claim 9, further comprising cooling the thermoformed and filled thermoforming film (3) bonded to the covering film (4) after the simultaneous thermoforming and sealing and before the punching out.

11. The method as claimed in claim 1, further comprising providing the application duct (6) in an end area with a predetermined breaking point (7) in order to form a tip that can be broken off or cut off.

12. The method as claimed in claim 1, further comprising punching out the thermoformed and filled areas of the thermoforming film (3) sealed with the covering film (4) in order to complete the application packages (1) as punched-out packages, and
packing each of the punched-out application packages (1) in a secondary package configured as a blister pack.

13. The method as claimed in claim 12,
wherein
the secondary package is comprised of laminated composite films including at least one of a layer of polyethylene terephthalate (PET), a layer of polypropylene (PP), or a layer of polyethylene (PE).

* * * * *